(12) United States Patent
Abraham et al.

(10) Patent No.: US 11,514,377 B2
(45) Date of Patent: Nov. 29, 2022

(54) SPACE ALLOCATION SYSTEMS FOR ALLOCATING SPACE TO OBJECTS WITH MULTI-VARIATE CHARACTERISTICS, AND METHODS THEREOF

(71) Applicant: Amadeus S.A.S., Biot (FR)

(72) Inventors: Eldho Abraham, Bangalore (IN); Suresh Yerva, Bangalore (IN)

(73) Assignee: Amadeus S.A.S., Biot (FR)

( * ) Notice: Subject to any disclaimer, the term of this patent is extended or adjusted under 35 U.S.C. 154(b) by 60 days.

(21) Appl. No.: 17/271,026

(22) PCT Filed: Sep. 9, 2019

(86) PCT No.: PCT/EP2019/073930
§ 371 (c)(1),
(2) Date: Feb. 24, 2021

(87) PCT Pub. No.: WO2020/053119
PCT Pub. Date: Mar. 19, 2020

(65) Prior Publication Data
US 2021/0201221 A1    Jul. 1, 2021

(30) Foreign Application Priority Data
Sep. 11, 2018  (IN) .............................. 201811034246

(51) Int. Cl.
*G06Q 10/04*     (2012.01)
*G06T 7/55*      (2017.01)
(Continued)

(52) U.S. Cl.
CPC ....... *G06Q 10/043* (2013.01); *G06Q 10/0832* (2013.01); *G06T 7/55* (2017.01); *G06T 7/62* (2017.01); *G06Q 50/30* (2013.01)

(58) Field of Classification Search
CPC .. G06Q 10/043; G06Q 10/0832; G06Q 50/30; G06Q 10/06315; G06T 7/55; G06T 7/62
See application file for complete search history.

(56) References Cited

U.S. PATENT DOCUMENTS

2001/0017940 A1 *  8/2001  Kim ................... G06F 16/5838
                                                382/162
2016/0109280 A1 *  4/2016  Tiu ......................... G01F 17/00
                                                702/173
(Continued)

FOREIGN PATENT DOCUMENTS

EP          3315407 A1    5/2018

OTHER PUBLICATIONS

European Patent Office, International Search Report dated Oct. 16, 2019 in PCT/EP2019/073930.

*Primary Examiner* — Chan S Park
*Assistant Examiner* — Daniel C Chang
(74) *Attorney, Agent, or Firm* — Thompson Hine LLP

(57) ABSTRACT

The present invention discloses a space allocation system and a method for allocating space to objects with multi-variate characteristics. In the present invention, intra-container allocation and/or inter-container allocation is performed to generate a combination in which the objects can be placed in one or more pre-defined storage spaces in a plurality of storage containers. The generated combination is further optimized for efficient space allocation to objects with multi-variate characteristics.

24 Claims, 9 Drawing Sheets

(51) Int. Cl.
*G06T 7/62* (2017.01)
*G06Q 10/08* (2012.01)
*G06Q 50/30* (2012.01)

(56) References Cited

U.S. PATENT DOCUMENTS

2017/0147966 A1    5/2017  Aversa et al.
2017/0328759 A1*  11/2017  Nicks ..................... G01B 21/28
2018/0086464 A1*   3/2018  Riedel .................... G06K 17/00
2018/0111698 A1*   4/2018  Podnar ................. G06Q 10/043

\* cited by examiner

| ROW | COL | EXS | DEF | PER |
|---|---|---|---|---|
| R1 | A | – | – | YES |
| | B | – | – | YES |
| | C | – | – | YES |
| | D | – | – | YES |
| | E | – | – | YES |
| | F | YES | – | – |
| R2 | A | – | – | YES |
| | B | – | – | YES |
| | C | – | – | YES |
| | D | – | – | YES |
| | E | – | – | YES |
| | F | YES | – | – |
| R3 | A | – | – | YES |
| | B | – | – | YES |
| | C | – | – | YES |
| | D | – | – | YES |
| | E | – | – | YES |
| | F | – | – | YES |
| R4 | A | – | – | YES |
| | B | YES | – | – |
| | C | – | – | YES |
| | D | – | – | YES |
| | E | – | – | YES |
| | F | – | – | YES |
| R5 | A | – | – | YES |
| | B | – | YES | – |
| | C | – | – | YES |
| | D | – | – | YES |
| | E | – | – | YES |
| | F | YES | – | – |
| R6 | A | YES | – | – |
| | B | – | – | YES |
| | C | – | – | YES |
| | D | – | – | YES |
| | E | – | – | YES |
| | F | – | – | YES |
| R7 | A | – | – | YES |
| | B | – | – | YES |
| | C | – | – | YES |
| | D | – | – | YES |
| | E | – | – | YES |
| | F | – | – | YES |
| R8 | A | YES | – | – |
| | B | – | – | YES |
| | C | – | – | YES |
| | D | YES | – | – |
| | E | – | – | YES |
| | F | – | – | YES |
| R9 | A | – | – | YES |
| | B | – | – | YES |
| | C | – | YES | – |
| | D | – | – | YES |
| | E | – | – | YES |
| | F | – | – | YES |
| R10 | A | – | – | YES |
| | B | – | – | YES |
| | C | – | YES | – |
| | D | – | – | YES |
| | E | YES | – | – |
| | F | – | – | YES |

| EXCESS | | DEFICIT | |
|---|---|---|---|
| ID | VOL | ID | VOL |
| ER1F | 69 | DR5B | 50 |
| ER2F | 68 | DR9D | 62 |
| ER4B | 72 | DR10C | 92 |
| ER5F | 79 | | |
| ER6A | 59 | | |
| ER8A | 71 | | |
| R8D | 85 | | |
| ER10E | 93 | | |

| PAIRS | | |
|---|---|---|
| ER1F-DR5B | ER1F-DR9D | ER1F-DR10C |
| ER2F-DR5B | ER2F-DR9D | ER2F-DR10C |
| ER4B-DR5B | ER4B-DR9D | ER4B-DR10C |
| ER5F-DR5B | ER5F-DR9D | ER5F-DR10C |
| ER6A-DR5B | ER6A-DR9D | ER6A-DR10C |
| ER8A-DR5B | ER8A-DR9D | ER8A-DR10C |
| R8D-DR5B | R8D-DR9D | R8D-DR10C |
| ER10E-DR5B | ER10E-DR9D | ER10E-DR10C |

VOL(E) - VOL(D) > 0

| VALID PAIRS | | |
|---|---|---|
| ER1F-DR5B | ER1F-DR9D | – |
| ER2F-DR5B | ER2F-DR9D | – |
| ER4B-DR5B | ER4B-DR9D | – |
| ER5F-DR5B | ER5F-DR9D | – |
| ER6A-DR5B | – | – |
| ER8A-DR5B | ER8A-DR9D | – |
| R8D-DR5B | R8D-DR9D | – |
| ER10E-DR5B | ER10E-DR9D | ER10E-DR10C |

| VALID PAIR PATH |
|---|
| ER2F-DR5B ▸ER1F-DR9D ▸ER10E-DR10C |
| ER4B-DR5B ▸ER1F-DR9D ▸ER10E-DR10C |
| ER5F-DR5B ▸ER1F-DR9D ▸ER10E-DR10C |
| ER6A-DR5B ▸ER1F-DR9D ▸ER10E-DR10C |
| ER8A-DR5B ▸ER1F-DR9D ▸ER10E-DR10C |
| ER8D-DR5B ▸ER1F-DR9D ▸ER10E-DR10C |
| ER10E-DR5B▸ER1F-DR9D ▸ER10E-DR10C |
| ER1F-DR5B ▸ER2F-DR9D▸ER10E-DR10C |
| ER4B-DR5B ▸ER2F-DR9D ▸ER10E-DR10C |
| ER5F-DR5B ▸ER2F-DR9D ▸ER10E-DR10C |
| ER6A-DR5B ▸ER2F-DR9D ▸ER10E-DR10C |
| ER8A-DR5B ▸ER2F-DR9D ▸ER10E-DR10C |
| ER8D-DR5B ▸ER2F-DR9D ▸ER10E-DR10C |
| ER10E-DR5B▸ER2F-DR9D ▸ER10E-DR10C |
| ER1F-DR5B ▸ER4B-DR9D ▸ER10E-DR10C |
| ER2F-DR5B ▸ER4B-DR9D▸ER10E-DR10C |
| ER5F-DR5B ▸ER4B-DR9D▸ER10E-DR10C |
| ER6A-DR5B ▸ER4B-DR9D ▸ER10E-DR10C |
| ER8A-DR5B ▸ER4B-DR9D ▸ER10E-DR10C |
| ER8D-DR5B ▸ER4B-DR9D▸ER10E-DR10C |
| ER10E-DR5B▸ER4B-DR9D▸ER10E-DR10C |
| ER1F-DR5B ▸ER5F-DR9D ▸ER10E-DR10C |
| ER2F-DR5B ▸ER5F-DR9D ▸ER10E-DR10C |
| ER4B-DR5B ▸ER5F-DR9D▸ER10E-DR10C |
| ER6A-DR5B ▸ER5F-DR9D ▸ER10E-DR10C |
| ER8A-DR5B ▸ER5F-DR9D ▸ER10E-DR10C |
| ER8D-DR5B ▸ER5F-DR9D ▸ER10E-DR10C |
| ER10E-DR5B▸ER5F-DR9D ▸ER10E-DR10C |
| ER1F-DR5B ▸ER8A-DR9D▸ER10E-DR10C |
| ER2F-DR5B ▸ER8A-DR9D▸ER10E-DR10C |
| ER4B-DR5B ▸ER8A-DR9D▸ER10E-DR10C |
| ER5F-DR5B ▸ER8A-DR9D▸ER10E-DR10C |
| ER6A-DR5B ▸ER8A-DR9D▸ER10E-DR10C |
| ER8D-DR5B ▸ER8A-DR9D▸ER10E-DR10C |
| ER10E-DR5B▸ER8A-DR9D▸ER10E-DR10C |
| ER1F-DR5B ▸ER8D-DR9D▸ER10E-DR10C |
| ER2F-DR5B ▸ER8D-DR9D▸ER10E-DR10C |
| ER4B-DR5B ▸ER8D-DR9D▸ER10E-DR10C |
| ER5F-DR5B ▸ER8D-DR9D▸ER10E-DR10C |
| ER6A-DR5B ▸ER8D-DR9D▸ER10E-DR10C |
| ER8A-DR5B ▸ER8D-DR9D▸ER10E-DR10C |
| ER10E-DR5B ER8D-DR9D ER10E-DR10C |

FIG. 9

SPACE ALLOCATION SYSTEMS FOR ALLOCATING SPACE TO OBJECTS WITH MULTI-VARIATE CHARACTERISTICS, AND METHODS THEREOF

FIELD OF THE INVENTION

The present invention relates to space optimization and more particularly, to a system and method for allocating space for objects with multi-variate characteristics.

BACKGROUND

Optimization challenges exist in various industries, such as travel, manufacturing, retail, logistics, and other industries. These challenges are primarily related to planning, assortment, and allocation of space in a manner to facilitate optimization of a storage space. Conventionally, space planning is mostly manual in most of the industries, which leads to improper utilization of an available space.

For example, in airlines industry, conventional methods and systems exist for allocating storage space inside airplanes. However, these conventional methods and systems fail to optimize the storage space allocation for proper utilization of the available storage space. In recent times, the number of passengers being put on an aircraft has pushed the interior loading capacity of many airplanes since their overhead storage space is not sufficient to accommodate all passengers. When a passenger checks in a pre-flight registration, the passenger has a choice of turning in larger luggage to be placed underneath the cabin of the airplane and one small carry-on item for overhead storage compartments located in the cabin of the aircraft. So far, there is no airline known which assigns an overhead compartment luggage storage area even though the storage compartments are labelled to corresponding seats on the airplane.

FIG. 1 illustrates a conventional process flow for luggage management in aircrafts.

However, due to rising fuel costs, passengers are charged for every additional piece of luggage the passengers want to check in to be placed in the cargo area of the airplane. This has encouraged passengers to increase the size of the luggage they carry-on to be placed in the overhead bin area of the aircraft. In result, when boarding an airplane, the lack of overhead luggage space for the increase in volume of carry-on luggage has increased flight delays. Flight delays have increased due to the airline making a false assumption that the entire carry-on luggage fits in the overhead bin area. As a result, not only boarding time increases but also de-boarding time increases, thereby delaying departure of the flight and increasing the operating hours of the flight journey affecting the overall schedule of the airport along with other airlines.

Moreover, there is an inconvenience and consumption of time, energy and effort on the part of both the passengers and the cabin crew who have to iron out the issues which may lead to delay in flight take-offs.

Similarly, another problem faced by the passengers is at the time of collecting luggage at the conveyer belt who have to wait for a long time to collect their checked-in luggage because the checked-in luggage is not in the order of the passengers' seating inside the plane. The checked-in luggage items are stored in the random order, due to which the passengers who had checked-in their luggage items early or even the passengers with priority have to wait for a long time to collect their luggage items.

The above-mentioned problems faced by the airlines industry can be encompassed in any other vessel with a limited degree of freedom where space and time are of constraint. Other such scenarios can include but are not limited to passengers travelling in ships, buses, and trains.

Further, for example, in retail industry various shelf space allocation techniques exist to facilitate allocation of retail shelf space. However, the shelf space allocation techniques are not automated enough that can be implemented to optimize space allocation and resources. Further, due to manual nature of the existing shelf space allocation techniques, it is difficult to obtain allocation results especially when space pertaining to thousands of retail shelves is to be allotted. In addition, it is not possible to incorporate additional business rules at run-time during allotment of the shelf space allocation manually.

Furthermore, for example, in logistics, it is one of the major challenges to optimize the utilization of space in a warehouse. Improper utilization of the space impacts major areas of operations. Some of the areas of operations may include, but are not limited to, scope for increasing the business revenue, lack of visibility on partially utilized locations resulting in poor result of warehouse occupancy rate, stock turnaround ratio of the warehouse is affected due to improper utilization of the space, and the like.

Therefore, there is a need to alleviate problems existing in prior arts.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose to present some concepts of the subject matter in a simplified form as a prelude to the more detailed description that is presented later.

According to one aspect of the present invention, a space allocation system for allocating space to objects with multi-variate characteristics is disclosed. The space allocation system includes a learning device, one or more input means, and a space-allocation device operatively coupled with the learning device and the one or more input means. The learning device obtains space data indicating available space in a pre-defined storage space. The one or more input means obtain object data indicating one or more characteristics of the objects to be placed in the pre-defined storage space. The space-allocation device processes the space data and the object data to generate a combination in which the objects can be placed in the pre-defined storage space. The space allocation device further optimizes the combination.

According to another aspect of the present invention, a method for allocating space to objects with multi-variate characteristics is disclosed. The method includes obtaining space data indicating available space in a pre-defined storage space and obtaining object data indicating one or more characteristics of the objects to be placed in the pre-defined storage space. The method further includes processing the space data and the object data to generate a in which the objects can be placed in the pre-defined storage space. Further, the method includes optimizing the generated combination.

In a preferred embodiment, space allocation for objects is performed based on intra-container allocation and inter-container allocation. The optimum combination is determined for placing the objects in one or more pre-defined storage spaces, which enables in dynamic and efficient space allocation for the objects with multi-variate characteristics. The present invention facilitates the most efficient solution by providing an optimized space to store one or more objects. The present invention provides the efficient solution by solving the space problem considering uniqueness of each situation rather than relying on manual intelligence.

These and other objects, embodiments and advantages of the present invention will become readily apparent to those skilled in the art from the following detailed description of the embodiments having reference to the attached figures, the invention not being limited to any particular embodiments discovered.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

FIGS. 7-12 illustrates an inter-container allocation process in accordance with the exemplary embodiment of the present invention.

DETAILED DESCRIPTION

Figure 1:
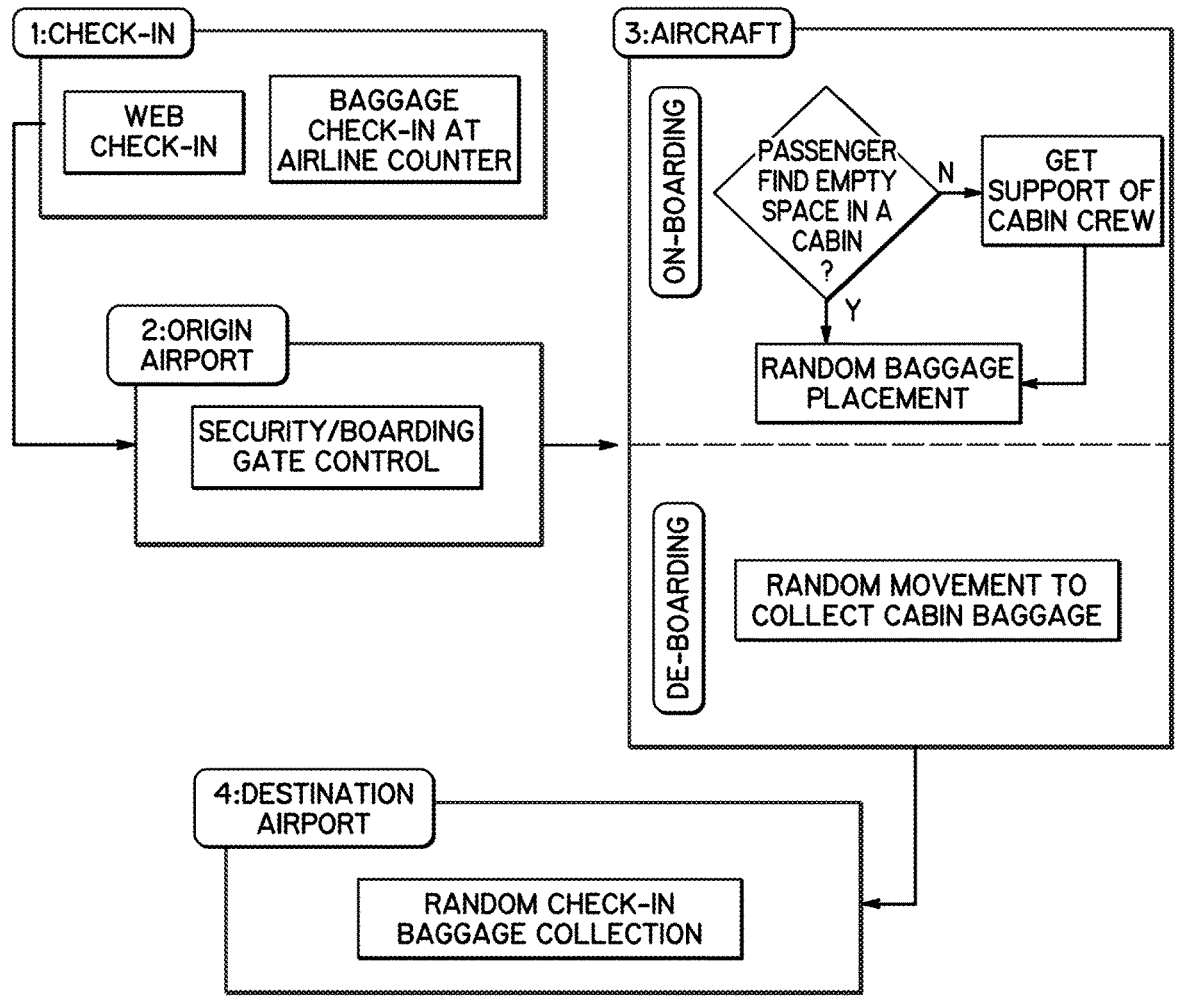
FIG. 1 illustrates a conventional process flow for luggage allocation in an aircraft.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

Figure 2:
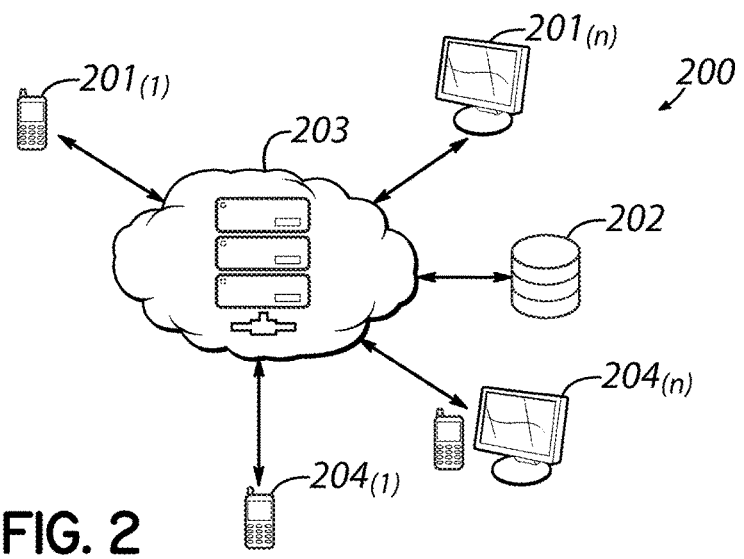
FIG. 2 illustrates an architecture of a system for allocating space for objects with multi-variate characteristics, in accordance with the present invention.

FIG. 2 illustrates an architecture of a space allocation system in accordance with an embodiment of the present invention. The system (200) comprises a plurality of input means ($201_1$-$201_n$) to obtain information about the objects with multi-variate characteristics. In one non-limiting embodiment, the information may be an image information including 3D depth maps of the objects and/or image sensor-based 3D reconstruction of the objects. It will be well understood by the person skilled in the art that the information is inputted by various input means including but not limited to a video camera of a mobile phone or by an independent video camera, ultrasonic sensors, barcode readers, or laser scanners or manually which may involve the use of input means ($201_1$-$201_n$). Further, the system (200) comprises a learning device (202) to obtain available space or available volume in one or more pre-defined storage spaces in one or more storage containers.

The system (200) further comprises a space-allocation device (203) operatively coupled to the plurality of input means ($201_1$-$201_n$) and the learning device (202). The space-allocation device (203) receives space data from the learning device (202). The space data indicates the available space or available volume in the one or more pre-defined storage spaces. The space-allocation device (203) further receives object data from one or more of the input means ($201_1$-$201_n$). The object data indicates one or more characteristics of the objects determined from the obtained information about the objects. In one non-limiting embodiment, the space-allocation device (203) may receive only information about the objects from the input means ($201_1$-$201_n$), and may further determine the object data by processing the received information. The space-allocation device (203)

processes the space data and the object data to generate one or more combinations in which the objects can be placed in the one or more pre-defined storage spaces in the one or more storage container. The space-allocation device (203) selects one optimum combination from the generated one or more combinations based on a pre-defined criterion. The determination of the pre-defined criteria is explained herein below with reference to FIG. 5-FIG. 12.

In one exemplary embodiment, the space-allocation device (203) receives the space data and the object data from one or more of the input means ($201_1$-$201_n$) and the learning device (202) through a wireless communication link. In another exemplary embodiment, the space-allocation device (203) receives the space data and the object data from one or more of the input means ($201_1$-$201_n$) and the learning device (202) through a wired communication link.

Figure 3:
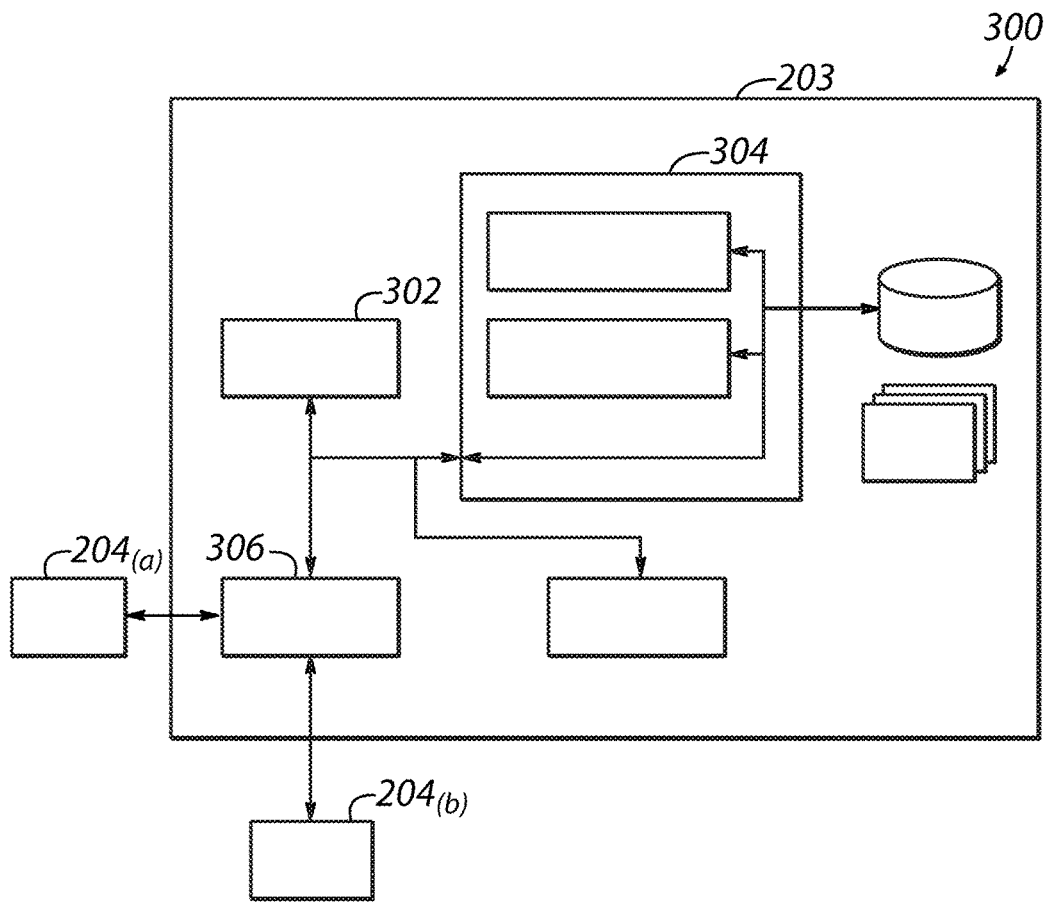
FIG. 3 illustrates a schematic diagram of the space-allocation device according to an embodiment of the present invention.

FIG. 3 illustrates a schematic block diagram of the space-allocation device (203) in accordance with the present invention. The space-allocation device (203) comprises a processor (302) and a memory (304). In one non-limiting embodiment, the memory (304) may store the space data, the object data, the generated one or more combinations, and the selected optimum combination. In one embodiment, the processor (302) retrieves the stored object data from the memory (304) instead of receiving the object data from the input means ($201_1$-$201_n$), when the space is to be allocated again for the objects which are already scanned by the input means ($201_1$-$201_n$) once. In another embodiment, the memory (304) stores history of the object data received by the space-allocation device (203) from the input means ($201_1$-$201_n$). The processor (302) processes the object data and the space data to generate one or more combinations in which the objects can be placed in the one or more pre-defined storage spaces in the one or more storage containers. The processor (302) further selects one optimum combination from the generated one or more combinations based on the pre-defined criteria.

In one embodiment, the space-allocation device (203) provides the selected optimum combination to one or more output devices ($204_{(1)}$-$204_{(n)}$) through I/O interfaces (306) by way of a notification. This notification to one or more output devices ($204_{(1)}$-$204_{(n)}$) may be a simple message, interactive messaging or an audio or a video notification or a combination thereof. In another non-limiting embodiment, the one or more output devices ($204_{(1)}$-$204_{(n)}$) are the electronic devices which may include a display ($204_a$) operatively coupled to the space-allocation device (203), to display the received notification. In one embodiment, the display ($204_a$) is configured to display three-dimensional (3D) view of the optimum combination in which the objects are to be placed in the one or more pre-defined storage spaces, with augmented reality. In another embodiment, the one or more output devices ($204_{(1)}$-$204_{(n)}$) includes external device(s) ($204_b$) operatively coupled to the space-allocation device (203).

In one non-limiting embodiment, the coupling between the one or more output devices ($204_{(1)}$-$204_{(n)}$) and the space-allocation device (203) is a wireless communication link, through which information regarding the selected optimum combination is communicated. In another non-limiting embodiment, the coupling between the one or more output devices (204) and the space-allocation device (203) is a wired communication link.

Figure 4:
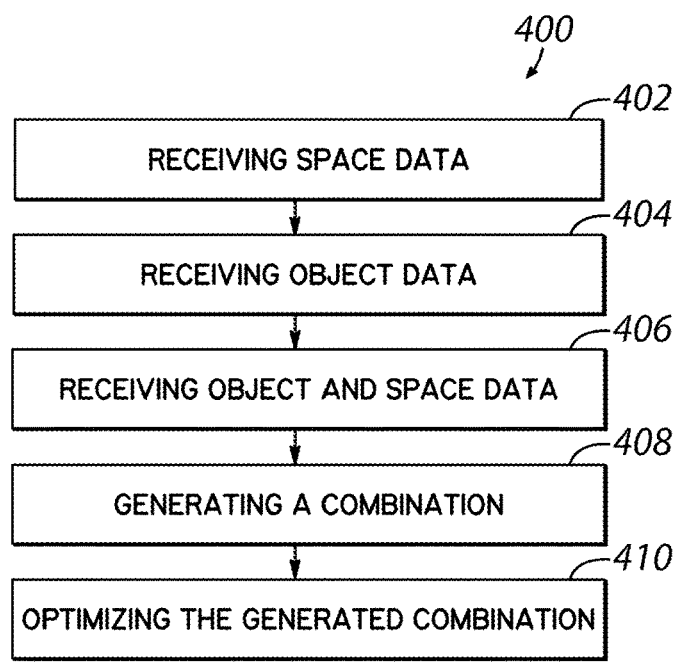
FIG. 4 illustrates a flowchart illustrating the method for space allocation according to an embodiment of the present invention.

FIG. 4 illustrates a space-allocation process in accordance with the exemplary embodiment of the present invention.

At step 402, object data is received from the one or more of the input means ($201_1$-$201_n$) and at step 404, space data is received by the space-allocation device (203) from the learning device (202).

At step 406, the received space data and the object data is processed by the space-allocation device (203).

At step 408, the one or more combinations in which the objects can be placed in one or more predefined storage spaces in a plurality of storage containers, are generated based on the processing of the space data and the object data performed at step 406.

At step, 410, an optimum combination is selected from the generated one or more combinations.

The process defined at steps 406, 408, and 410 are further described in detail with reference to FIG. 5-FIG. 12 herein below.

Figure 5:
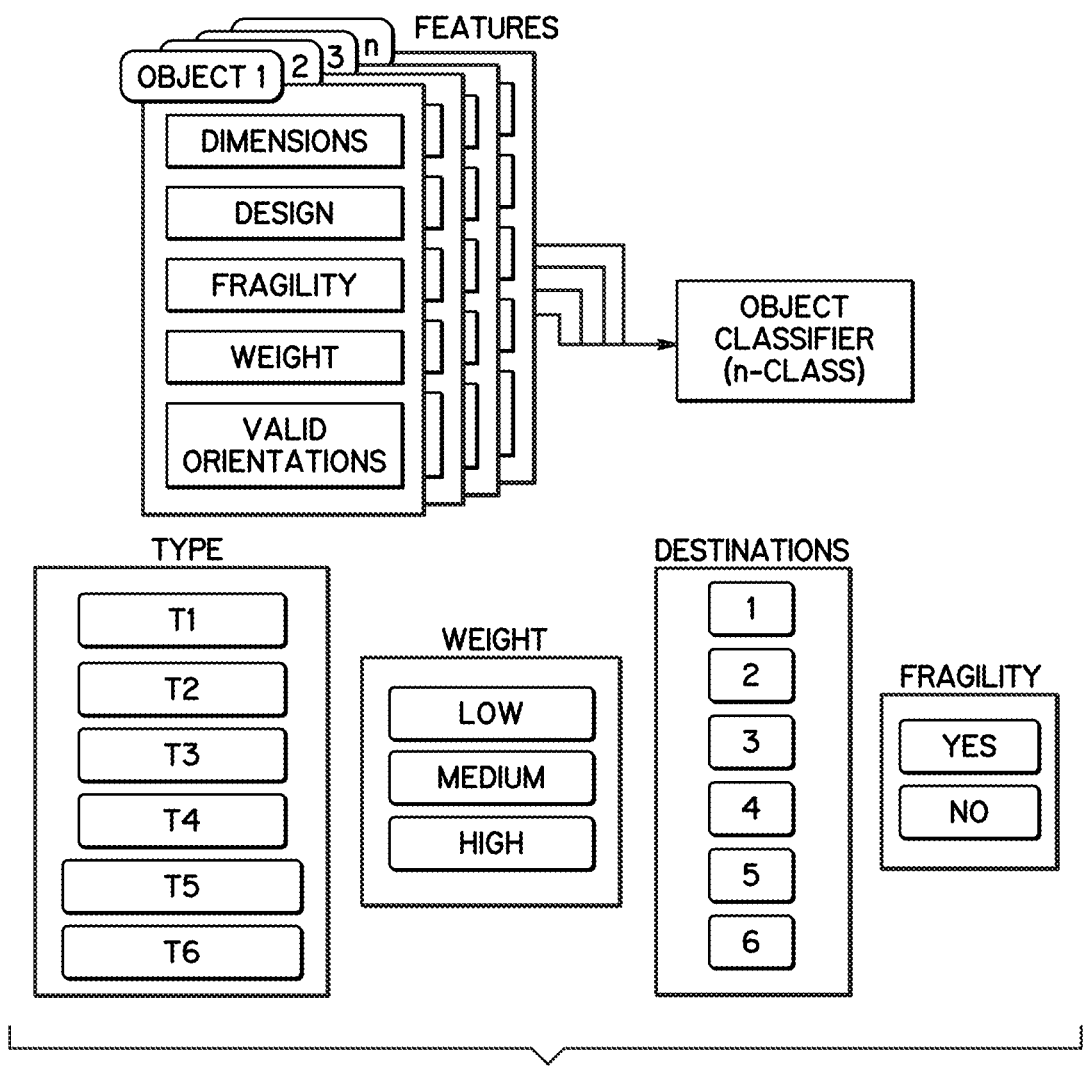
FIG. 5 illustrates a classification of objects during space-allocation process in accordance with the exemplary embodiment of the present invention.

The space-allocation device (203) receives object data from the input means ($201_1$-$201_n$). The object data includes one or more characteristics of the objects which are to be placed in one or more pre-defined storage spaces. In one non-limiting embodiment, the pre-defined spaces include closed spaces with a limited degree of freedom. The characteristics of the objects include features of the objects, such as weight, type, fragility, design, orientation, and dimensions. In one embodiment, depending on the characteristics of the objects, a storage value indicating volume of the objects is determined by the space-allocation device (203). In another embodiment, storage value indicating volume of the objects is included in the object data received from the input means ($201_1$-$201_n$). Further, depending on the characteristics of the objects, the objects are classified as shown in FIG. 5.

In one non-limiting embodiment, for a storage container, the space-allocation device (203) maps the storage value of the objects with an available space in the pre-defined storage space of the storage container. In one embodiment, the space-allocation device (203) may determine which of the objects are to be stored in the available space. In one exemplary embodiment, based on a priority information associated with the objects, the space-allocation device (203) determines a storage container and further determines a storage space inside the storage container, in which the objects are to be stored. In further exemplary embodiment, determining of the storage space relates to but not limited to determining volume of the storage container. After determining the storage space in the storage container in which the objects are to be stored, the space-allocation device (203) performs intra-container allocation for the determined storage space.

In the intra-container allocation, the space-allocation device (203) maps the storage value indicating volume of the objects with the determined storage space. Based on the mapping of the storage value of the objects with the determined storage space, the space-allocation device (203) determines a placement value indicating whether the determined storage space is perfect for placing the objects or the determined storage space is deficient for placing the objects or the determined storage space is in excess for placing the objects.

Figure 6:
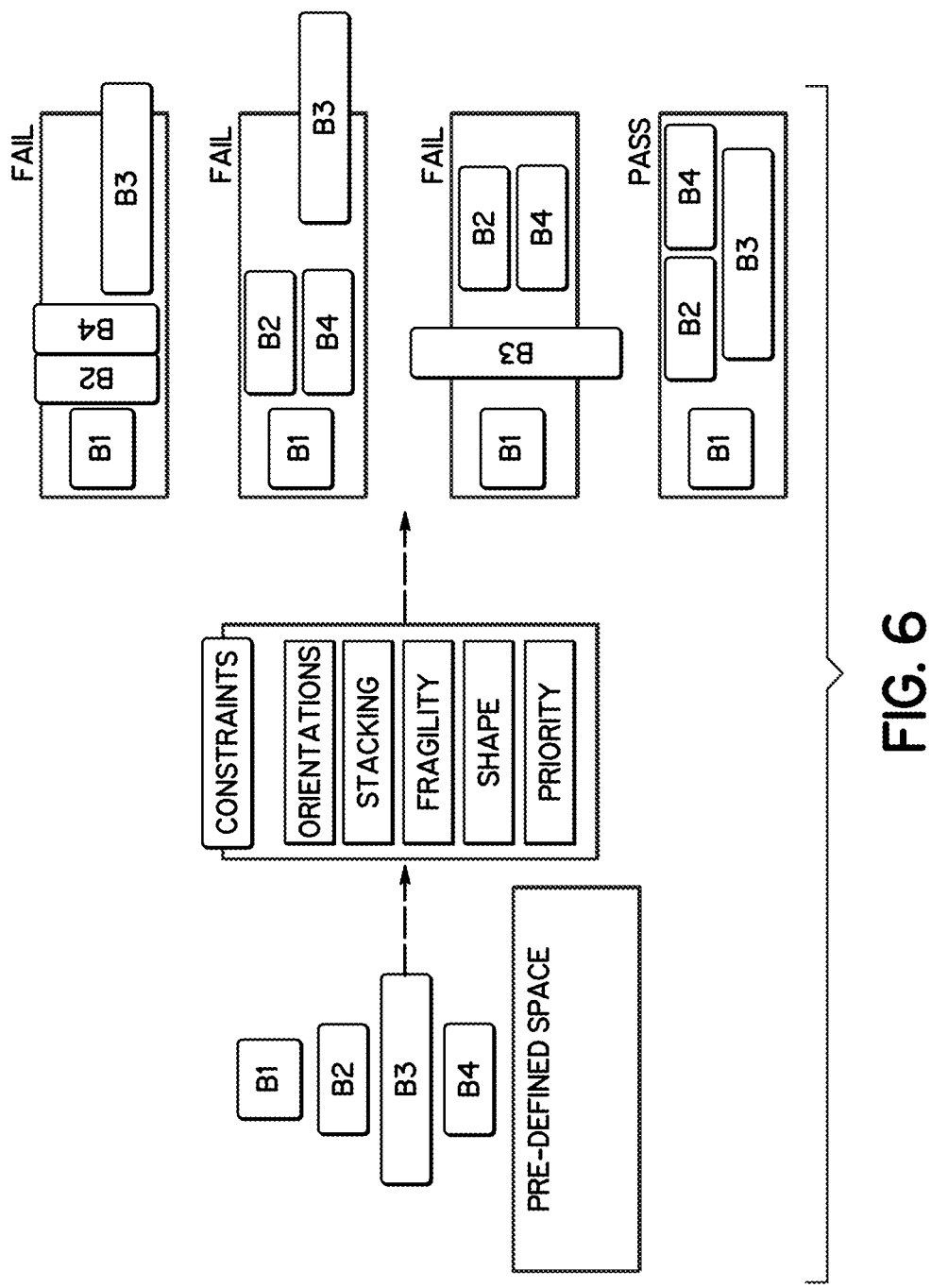
FIG. 6 illustrates an intra-container allocation process in accordance with the exemplary embodiment of the present invention.
Figure 7:
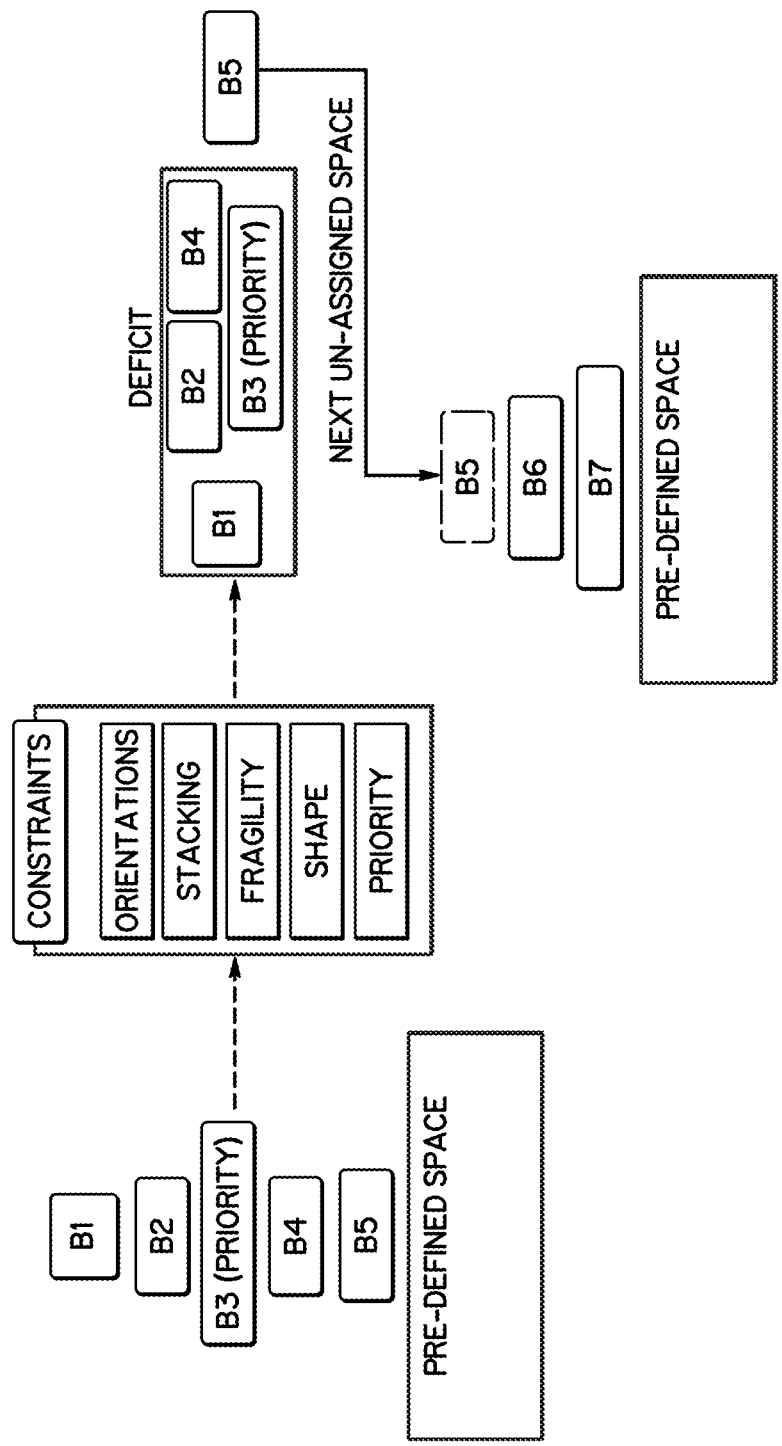
Figure 8:
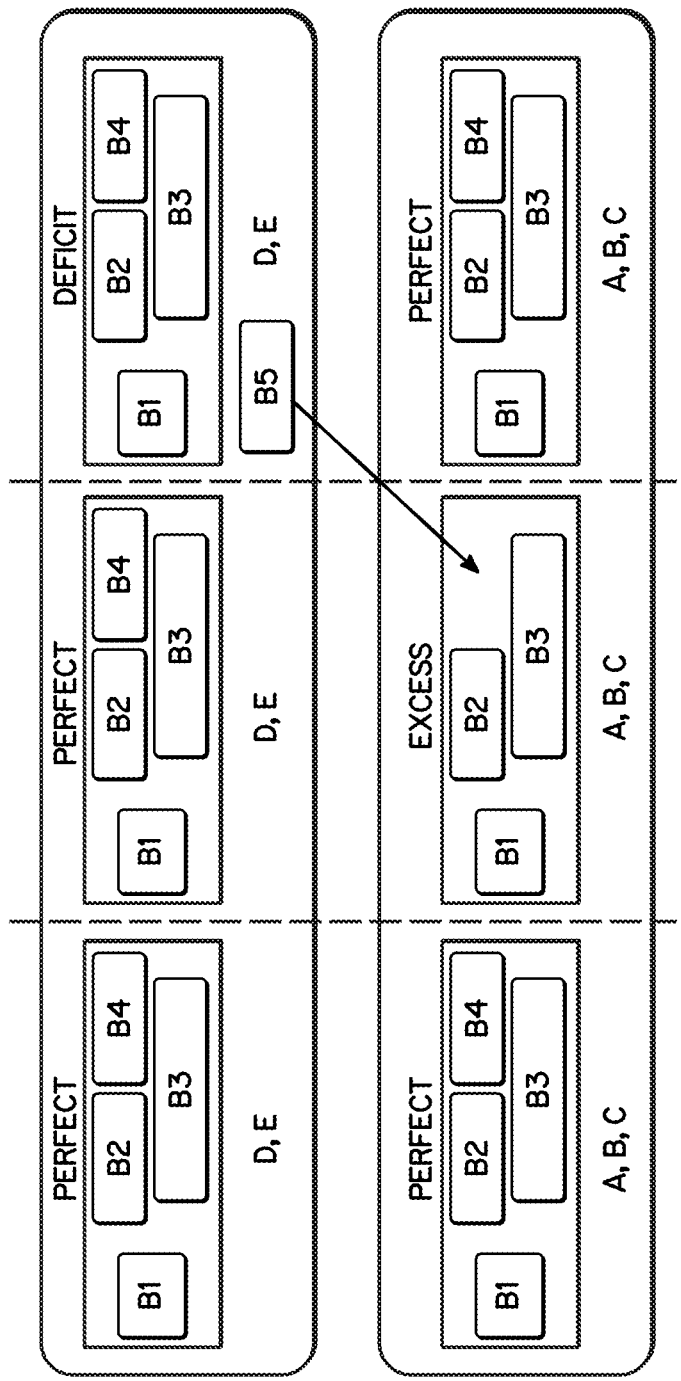
Figure 10:
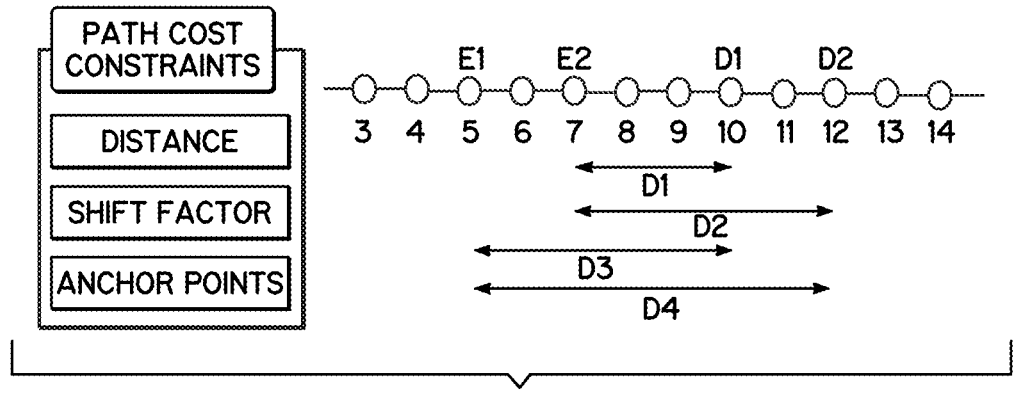
Figure 11:
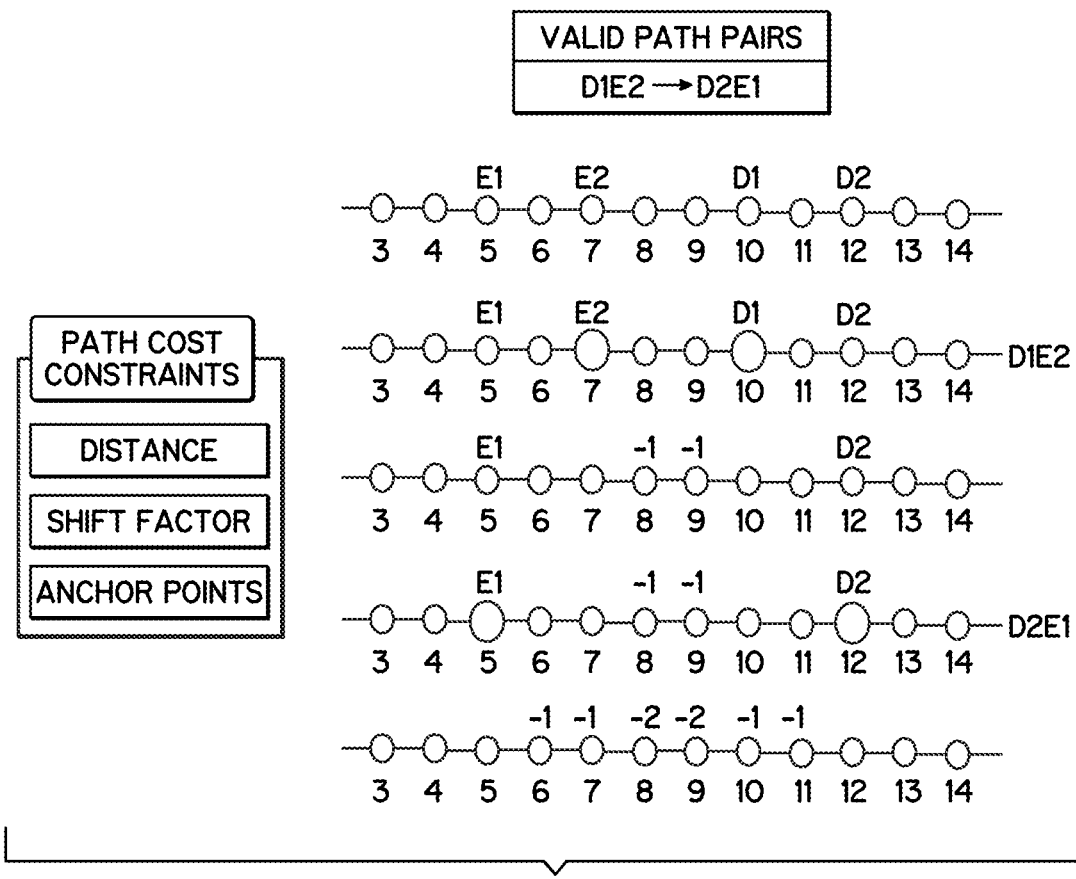
Figure 12:
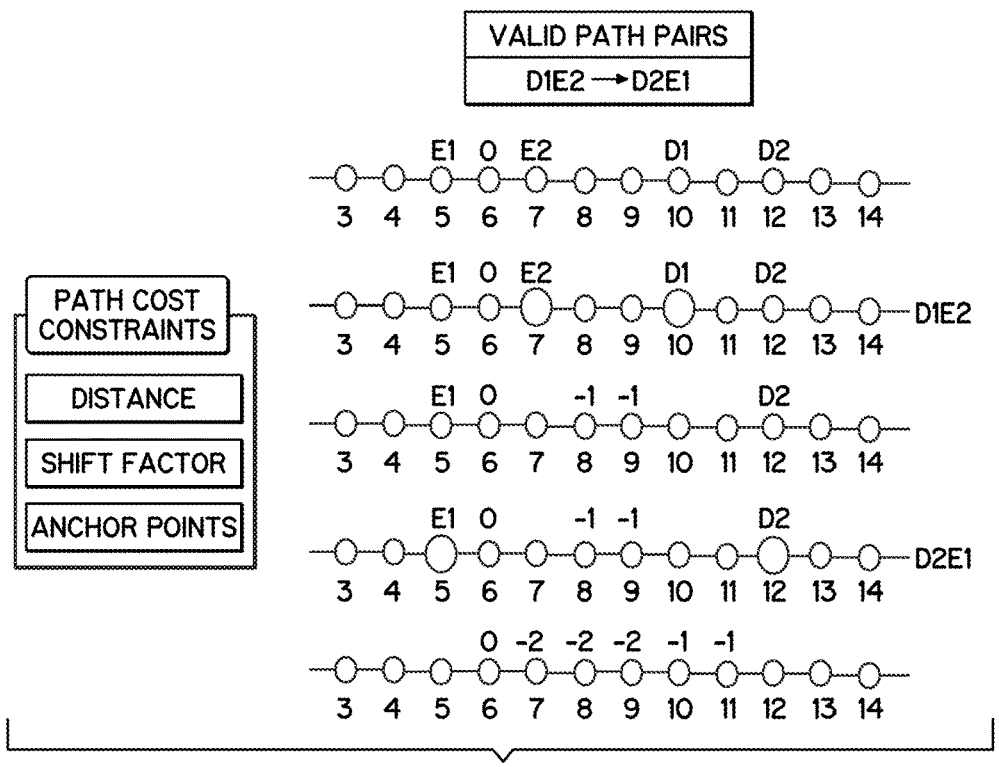

In an event, the placement value is zero meaning that the determined storage space is appropriate for placing the objects, the space-allocation device (203) determines one or more combinations in which the objects can be placed in the determined storage space, as shown in FIG. 6. In an embodiment, a combination is generated, the space-allocation device (203) further optimizes the combination based on the classification of the objects. In another embodiment, a plurality of combinations is generated, the space-allocation device (203) selects one optimum combination from the plurality of combinations depending on the classification of the objects, to optimize the space allocation to objects. For example, the space-allocation device (203) determines that out of the objects which are to be placed in the determined space, one object is classified as 'fragile'. Accordingly, the space-allocation device (203) determines a combination in which the object which is classified as 'fragile' is not placed under any other object in the determined space. Further, for example, the space-allocation device (203) determines that out of the objects which are to be placed in the determined space, a first set of objects is classified as "grouped". Accordingly, the space-allocation device (203) determines a combination in which the objects included in the set classified as "grouped" are placed together.

In an event, the placement value is negative meaning that the determined storage space in the storage container is deficient for placing the objects or the placement value is positive meaning that the determined storage space in the storage container is excessive for placing the objects, the space-allocation device (203) performs inter-container allocation.

In inter-container allocation, the space-allocation device (203) identifies spaces in other storage containers which may be used for storing the objects. The space-allocation device (203) identifies, within the other storage containers, first storage containers having negative placement values meaning that the first storage containers having deficient storage space and second storage containers having positive placement values meaning that the second storage containers having excessive storage space. The identified first storage containers and the second storage containers are paired with each other in such a manner that, in each pair, absolute value of the positive placement value is superior that an absolute value of the negative placement value. Further, the pairing is performed in such a manner that in each pair, excess space of one container is sufficed by deficit space of another container, thereby forming a pair, and these excess and deficit space cannot be paired with any other deficit and excess space respectively. Furthermore, the pairing is performed in such a manner that, in each pair, either one or more of the first storage containers are paired with one of the second storage containers, or one of the first storage containers is paired with one or more of the second storage containers. The space-allocation device (203) determines an effort quotient for each of the pair based on one or more constraints. The pair for which the effort quotient is minimum is selected as an optimum combination for placing the objects.

In one non-limiting embodiment, the effort quotient is determined based on minimisation of the error for the selection of a best element from some set of available alternatives. The constraints used herein are referred to but not limited to a distance, shift factor, and anchor points. In one non-limiting embodiment, the distance relates to a distance between the first storage container and the second storage container in each pair. In one non-limiting embodiment, the shift factor relates to shifting of objects placed in other storage container which are located in between the first storage container and the second storage container in each pair. In one non-limiting embodiment, the anchor points relate to objects with priority and cannot be shifted to other storage containers. In other non-limiting embodiment, the anchor points relate to spaces where no object can be placed.

In an exemplary embodiment as shown in FIG. 9-FIG. 12, the space-allocation device (203) labels the deficient space in one storage container as (D), labels the perfect space in other storage container as (P), and labels the excess space in the other storage container as (E). For example, the pairing of deficient spaces presents in first storage containers and excess spaces present in second storage containers is performed and a valid pair path between each of the excess and deficient spaces pairing is determined. For example, D (space deficit) is sufficed by E (space excess) or, in other words, D-E pairs identification is performed. There are multiple scenarios considered while making D-E pairs: (1) space deficit requirement of a determined space (which indeed has initial label 'D') can be met by excess space available in other determined space (which indeed has initial label 'E'). Then single D is paired with single E. (2) One 'D' is paired with multiple 'E's. (3) Multiple 'D's are paired with single 'E' (4) the pairing of D and E is done while making sure that the volume of the space available in E is sufficient for its corresponding D.

After identification of all possible valid pairs, optimum pair is selected from valid pairs. From the valid pairs D and E, a list of valid pair path is identified. A valid pair path is defined as a path of unique D and E pairs. Once a D is sufficed by an E, same E cannot be used again. For example, in the below path, all the D-E and E pairs are unique

ER2F-DR5B→ER1F-DR9D→ER10E-DR10C

It will be well understood that multiple pair paths are possible with the available valid D-E pairs. The identification of optimum valid pair path is important in order to allocate the space efficiently. While identifying the optimum valid pair path, the constraints are considered such as: (1) Distance; (2) Shift factor; and (3) Anchor points. The distance relates to a valid D-E pair, wherein more distance means more time. The shift factor relates to a condition, wherein in a valid pair path, once every D-E pair is solved based on the distance, the objects in between those pair are shifted. '−' signifies left shift and '+' signifies right shift. More shift values mean more time. The Anchor points are objects with priority, wherein the objects of the anchor points cannot be shifted to the other spaces.

In one non-limiting embodiment, it will be well understood by a person skilled in the art that the electronic devices ($201_1$-$201_n$) may utilise several mechanisms to find 3D structure/shape of objects. Such algorithms can be broadly classified into two categories (1) Active Methods and (2) Passive Methods.

Active methods build 3D depth maps using either mechanical means or radiometric-means. A simple example of a mechanical method would use a depth gauge to measure a distance to a rotating object put on a turntable. More applicable radiometric methods emit radiance towards the object and then measure its reflected part. Such examples range from moving light sources, coloured visible light, time-of-flight lasers to microwaves or ultrasound.

Passive methods of 3D reconstruction do not interfere with the reconstructed object. They only use a sensor to measure the radiance reflected or emitted by the object's surface to infer its 3D structure through image understanding. Typically, the sensor is an image sensor in a camera sensitive to visible light and the input to the method is a set of digital images (one, two or more) or video.

In the present invention, the preferred mechanism is passive method for image-based reconstruction and the output is a 3D model. For example, SFM (Structure from motion), Stereo imaging and the like.

Implementation Example 1: Airline Industry

Figure 13:
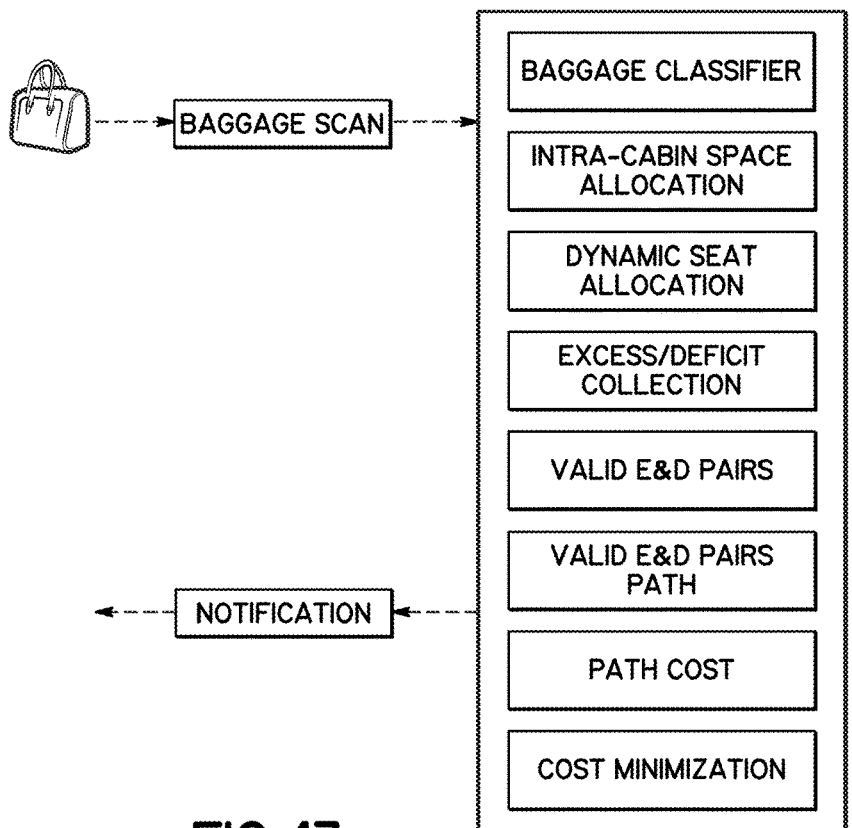
FIG. 13 illustrates space allocation process in an aircraft, in accordance with an exemplary embodiment of the present invention.

The system of the present invention may be used to allocate space for storing baggage items in a storage space of an aircraft, as shown in FIG. 13.

For cabin space allocation: The system may receive space data indicating available space in one or more cabin areas provided over the seats inside an aircraft. The system may further receive object data indicating characteristics of the one or more baggage items which are to be placed in the one or more cabin areas of the aircraft. The space allocation device of the system may determine the one or more combinations in which the one or more baggage items can be placed in the one or more cabin areas. The space allocation device may further select an optimum combination from the one or more combinations based on a predefined criterion as described with reference to FIG. 5-FIG. 12.

The system may perform intra-cabin space allocation based on characteristics of the one or more baggage items and available space in a cabin area in which the one or more baggage items need to be placed. Further, the system may perform inter-cabin space allocation in cases where the available space in the selected cabin area is deficient. As explained in FIG. 5-FIG. 12, the system may identify deficit and excess spaces in the cabin areas and may further determine valid pair paths between the deficit and excess spaces. The system may further determine, based on the constraints and valid pair paths, the effort quotient. The valid pair path having the minimum effort quotient is determined as the optimum combination in which the one or more baggage items need to be placed in the inter-cabin space allocation. Preferably, the cabin space allocation is performed before beginning of the boarding of travellers.

In cabin space allocation, distance refers to a distance between a valid pair of deficient cabin area and cabin area having an excess space. Shift factor refers to shifting of baggage items placed in cabin areas located between the identified deficient cabin area and the identified cabin area having the excess space. The anchor points refer to baggage items having priority associated with them and cannot be shifted to other cabin areas. In one example, the priority refers to but not limited to frequent flyer or web checked in traveller.

The determined optimum combination may be provided to a display or other external devices, as explained with reference to FIG. 2-FIG. 3. It will be well understood by a person skilled in the art that the display (204a) may be provided in the respective cabin slots with which the cabin crew can help the travellers. Alternatively, the determined optimum combination may be available on the external devices of the airline crew.

For cargo space allocation: The space allocation for the check-in luggage inside a cargo area of the aircraft, may be done in a similar process as described for cabin space allocation. However, for cargo space allocation, the system may additionally use the seating order of the travellers and the distance of the seat from the exit doors (with the help of destination airport details to know if the aircraft is front exit/back exit/both). The travellers seated closer to the exit doors are the ones to arrive at the baggage collection sooner, and accordingly the baggage items are placed in the cargo area of the aircraft.

In another exemplary embodiment, the system of the present invention may perform a dynamic seat assignment using intra cabin space allocation according to an exemplary embodiment of the present invention. While assigning seats to the passengers, Intra cabin space allocation process computes the optimum allocation with constraints as mentioned above. Based on the baggage items information of the traveller, unassigned seats are checked for optimum space allocation. If a particular unassigned seat doesn't meet the Intra-Cabin space allocation constraints, next unassigned seat is checked. The baggage items of a particular seat, which is booked on a priority basis (treated as anchor point), is also given priority while Intra-cabin space allocation combinations are obtained.

The system of the present invention may also perform luggage grouping. The travellers who are traveling together and wish to sit together, their baggage items are treated as a single entity with respect to their seats. The grouping is optimised depending on the characteristics of the baggage items, such as the orientation, fragility, stacking and shape.

Implementation Example 2: Warehouses

The system of the present invention may be used to allocate space for storing items in a warehouse. As explained above in the description, the system may be used to perform intra-container allocation and inter-container allocation for storing items in a storage space in the warehouse. The deficit storage space and excess storage space pairs may be identified and based on the constraints defined above in the description, effort quotient may be determined for inter space allocation. In this example, the anchor points may depict spaces which are assigned to be empty or assigned to store items different from the items for which the space-allocation is being performed.

Implementation Example 3: Parking of Vehicles in a Parking Area

The system of the present invention may be used to allocate parking space for parking vehicles in a closed area. As explained above in the description, the system may be used to perform intra-container allocation and inter-container allocation for parking vehicles in a parking area. For intra-container allocation, the characteristics of vehicles such as length and/or dimensions may be used. For inter-container allocation, the deficit storage space and excess storage space pairs may be identified and based on the constraints defined above in the description, effort quotient may be determined for inter-container allocation. In this example, the shift factor may be the number of cars parked in the areas between the identified deficit parking slot and the identified excess parking slot, are to be shifted. The anchor points may depict spaces which are assigned to be used for cars having priority associated with them or the cars which arrive frequently in the parking area. As explained, the system of the present invention may be used to dynamically determine a parking slot for a car rather than allocating a fixed space for vehicles.

Implementation Example 4: Optimal Crowd Management in a Concert Venue

The system of the present invention may be used for optimal crowd management in a concert venue. Depending on physique and other body measurements of people, the system of the present invention may allocate optimized standing/sitting space for a crowd at a concert venue.

Implementation Example 5: Inventory Management

The system of the present invention may be used for inventory management by enabling proper management of shelf space allocation and products display. The system of the present invention may be used for allocating, tracking and maintaining space and occupancy information.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The flowchart and schematic diagrams illustrate the architecture, functionality, and operations of some embodiments of methods, systems, and computer program products for managing security associations over a communication network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary non-limiting embodiments of the invention. Although specific terms are employed, they are used in a generic and descriptive sense only and not for purposes of limitation.

The invention claimed is:

1. A space allocation system for allocating an available space to objects with multi-variate characteristics, the space allocation system comprising:
    a learning device configured to obtain space data indicating the available space in a storage space;
    one or more input devices configured to obtain object data indicating one or more characteristics of the objects to be placed in the storage space; and
    a space-allocation device operatively coupled to the learning device and the one or more input devices to receive the space data and the object data,
    wherein the space-allocation device is configured to process the space data and the object data to generate a combination in which the objects can be placed in the storage space, the space-allocation device is configured to optimize the combination, the space-allocation device is configured to determine a storage value indicating a volume of the objects based on the one or more characteristics of the objects, the one or more characteristics of the objects comprise weight, type, fragility, design, orientation, or dimension, the space-allocation device is configured to classify the objects based on the one or more characteristics of the objects to generate classification data for each of the objects, the space-allocation device is configured to map the storage value of the objects with the space data indicating the available space in the storage space, the storage space is present inside a plurality of storage containers, and the space-allocation device is configured to determine, for each storage container and for the combination, a placement value based on the mapping of the storage value of the objects with the space data, and
    wherein the placement value is equal to zero, meaning that the available space is appropriate for placing the objects; negative, meaning that the available space is deficient for placing the objects; or positive, meaning that the available space is excessive for placing the objects.

2. The space allocation system of claim 1, wherein the object data comprises 3D depth maps of the objects and/or image sensor-based 3D reconstruction of the objects.

3. The space allocation system of claim 1, wherein the space-allocation device is configured to receive the object data from the one or more input devices through a wireless link or a wired connection.

4. The space allocation system of claim 1, wherein the space-allocation device is configured to store the object data in a memory, and the space-allocation device is configured to retrieve the object data from the memory in an event the space is to be allocated again to the same objects.

5. The space allocation system of claim 1, wherein the one or more input devices comprise a video camera of a mobile phone, an independent video camera, an ultrasonic sensor, a barcode reader, or a laser scanner.

6. The space allocation system of claim 1, wherein the space-allocation device is configured to provide a notification indicating the determined optimum combination to one or more output devices, and the one or more output devices are operatively coupled to the space-allocation device through a wireless link or a wired connection.

7. A method for allocating an available space to objects with multi-variate characteristics, the method comprising:
    obtaining, by a learning device, space data indicating the available space in a storage space;
    obtaining, by one or more input devices, object data indicating one or more characteristics of the objects to be placed in the storage space;
    receiving, by a space-allocation device, the space data and the object data;
    determining, by the space-allocation device, a storage value indicating volume of the objects based on the one or more characteristics of the objects;
    classifying, by the space-allocation device, the objects based on the one or more characteristics of the objects to generate classification data for each of the objects;
    mapping, by the space-allocation device, the storage value of the objects with the space data indicating the available space in the storage space; and
    determining, by the space-allocation device for the storage container and for the combination, a placement value based on the mapping of the storage value of the objects with the space data,
    wherein the space data and the object data is processed by the space-allocation device to generate a combination in which the objects can be placed in the storage space, the combination is optimized by the space-allocation device, the one or more characteristics of the objects comprise weight, type, fragility, design, orientation, or dimensions, and the storage space is present inside a plurality of storage containers, and
    wherein the placement value is equal to zero, meaning that the available space is appropriate for placing the objects; negative, meaning that the available space is deficient for placing the objects; or positive, meaning that the available space is excess for placing the objects.

8. The method of claim 7, comprising:

performing, by the space-allocation device, an intra-container allocation for the corresponding storage container when the placement value is zero, by optimizing the combination based on the classification data generated for each of the objects.

9. The method of claim 7, comprising:

performing, by the space-allocation device, an inter-container allocation when the placement value is positive or when the placement value is negative.

10. The method of claim 9, comprising:

forming, by the space-allocation device, pairs comprising first storage containers having a positive placement value and second storage containers having a negative placement value, wherein, in each of the pairs, either one or more of the first storage containers are paired with one of the second storage containers, or one of the first storage containers is paired with one or more of the second storage containers.

11. The method of claim 10, wherein, in each pair, an absolute value of the positive placement value is greater than an absolute value of the negative placement value.

12. The space allocation system of claim 1, wherein, when the placement value is zero, the space-allocation device is configured to perform an intra-container allocation for the corresponding storage container, and wherein for the intra-container allocation, the space-allocation device is configured to optimize the combination based on the classification data generated for each of the objects.

13. The space allocation system of claim 1, wherein, when the placement value is positive or negative, the space-allocation device is configured to perform an inter-container allocation.

14. The space allocation system of claim 13, wherein for the inter-container allocation, the space-allocation device is configured to form pairs comprising first storage containers having a positive placement value and second storage containers having a negative placement value, and wherein, in each pair, either one or more of the first storage containers are paired with one of the second storage containers, or one of the first storage containers is paired with one or more of the second storage containers.

15. The space allocation system of claim 14, wherein, in each pair, an absolute value of the positive placement value is greater than an absolute value of the negative placement value.

16. The space allocation system of claim 15, wherein the space-allocation device is configured to determine an effort quotient for each of the pairs, based on one or more of: distance between the first storage container and the second storage container in each of the pairs, shift factor associated with the objects placed in other storage containers present in-between the first storage container and the second storage container, and/or anchor points present among the objects placed in the first storage container and the second storage container in each pair.

17. The space allocation system of claim 15, wherein the space-allocation device is configured to optimize the combination by selecting a pair for which the determined effort quotient is minimum.

18. The method of claim 11 comprising:

determining, by the space-allocation device, an effort quotient for each of the pairs, based on one or more of: a distance between the first storage container and the second storage container in each of the pairs, a shift factor associated with the objects placed in other storage containers present in-between the first storage container and the second storage container, and/or anchor points present among the objects placed in the first storage container and the second storage container in each pair.

19. The method of claim 18, wherein optimizing the combination comprises:

selecting a pair for which the determined effort quotient is minimum.

20. The method of claim 7, wherein the object data comprises 3D depth maps of the objects and/or image sensor-based 3D reconstruction of the objects.

21. The method of claim 7, wherein the object data is received from the one or more input devices by the space-allocation device through a wireless link or a wired connection.

22. The method of claim 7 comprising:

storing the object data in a memory, wherein the stored object data is retrieved from the memory in an event the space is to be allocated again to the same objects.

23. The method of claim 7, wherein the one or more input devices comprise a video camera of a mobile phone, an independent video camera, an ultrasonic sensor, a barcode reader, or a laser scanner.

24. The method of claim 7, comprising:

providing, by the space-allocation device, a notification indicating the determined optimum combination to one or more output devices, wherein the one or more output devices are operatively coupled to the space-allocation device through a wireless link or a wired connection.

* * * * *